United States Patent
Okada et al.

(10) Patent No.: US 12,079,025 B2
(45) Date of Patent: Sep. 3, 2024

(54) INPUT DEVICE

(71) Applicant: Panasonic Intellectual Property Management Co., Ltd., Osaka (JP)

(72) Inventors: Mayuko Okada, Fukui (JP); Hidekatsu Natami, Kanagawa (JP); Toshio Osawa, Kanagawa (JP); Daiki Kaburagi, Fukui (JP); Mitsuo Kodama, Fukui (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 107 days.

(21) Appl. No.: 17/894,906

(22) Filed: Aug. 24, 2022

(65) Prior Publication Data

US 2023/0077897 A1 Mar. 16, 2023

(30) Foreign Application Priority Data

Sep. 10, 2021 (JP) .................................. 2021-147853

(51) Int. Cl.
| | |
|---|---|
| *H01H 19/20* | (2006.01) |
| *B60Q 1/00* | (2006.01) |
| *G05G 9/04* | (2006.01) |
| *H01H 19/14* | (2006.01) |
| *H01H 19/36* | (2006.01) |

(52) U.S. Cl.
CPC .............. *G05G 9/04* (2013.01); *B60Q 1/0076* (2013.01); *H01H 19/14* (2013.01); *H01H 19/20* (2013.01); *H01H 19/36* (2013.01); *H01H 2221/014* (2013.01); *H01H 2231/026* (2013.01)

(58) Field of Classification Search
CPC ........ G05G 9/04; B60Q 1/343; B60Q 1/0076; H01H 2221/014; H01H 19/36; H01H 19/20; H01H 19/14
USPC ...... 74/486, 471 XY, 471 R, 473.32, 373.31, 74/473.19, 118, 22 A, 53, 56
See application file for complete search history.

(56) References Cited

U.S. PATENT DOCUMENTS 10,443,720 B2 * 10/2019 Park ........................ F16H 63/18
2016/0247645 A1 8/2016 Ishigure et al.

FOREIGN PATENT DOCUMENTS

| JP | 2007273155 A | 10/2007 |
|---|---|---|
| JP | 2007273156 A | 10/2007 |
| JP | 2016157614 A | 9/2016 |

* cited by examiner

*Primary Examiner* — T. Scott Fix
(74) *Attorney, Agent, or Firm* — Seed IP Law Group LLP (57) ABSTRACT

An input device includes: a rotating member that rotates about a predetermined rotation axis; and a mover that includes a protrusion protruding toward an inner peripheral surface of the rotating member and moves in a direction different from a rotation direction of the rotating member along with rotation of the rotating member. The protrusion protrudes toward an inner peripheral surface of the rotating member. The rotating member includes a first projection and a second projection that project from the inner peripheral surface toward the mover. The protrusion of the mover is inclined with respect to the predetermined rotation axis and disposed between the first projection and the second projection.

8 Claims, 11 Drawing Sheets

INPUT DEVICE

CROSS REFERENCE TO RELATED APPLICATION

The present application is based on and claims priority of Japanese Patent Application No. 2021-147853 filed on Sep. 10, 2021.

FIELD

The present disclosure relates to an input device.

BACKGROUND

An input device is provided to an operating lever, such as a turn lever and a wiper lever included in a vehicle (for example, see Patent Literature (PTL) 1). The input device includes a rotating member, a mover, and a motion converting mechanism.

The rotating member can rotate about a predetermined rotation axis in a first direction and a second direction opposite to the first direction. In response to rotation of the rotating member in the first direction or the second direction, the motion converting mechanism converts the rotation of the rotating member into a linear movement of the mover. According to the amount and the direction of linear movement the mover, headlights are switched between on and off or the intermittent operation cycle of wipers is switched.

The motion converting mechanism includes a projection that has a cylindrical shape and projects from the inner peripheral surface of the rotating member, and a groove formed in the mover. The groove is formed to be inclined with respect to the predetermined rotation axis of the rotating member. The projection is slidably engaged with the groove.

CITATION LIST

Patent Literature

PTL 1: Japanese Unexamined Patent Application Publication No.

SUMMARY

However, the input device disclosed by the above-described PTL 1 can be improved upon.

In view of this, the present disclosure provides an input device capable of improving upon the above related art.

An input device according to one aspect of the present disclosure includes: a rotating member that rotates about a predetermined rotation axis; and a mover that includes a protrusion and moves in a direction different from a rotation direction of the rotating member along with rotation of the rotating member, the protrusion protruding toward an inner peripheral surface of the rotating member. The rotating member includes a first projection and a second projection that project from the inner peripheral surface toward the mover, and the protrusion of the mover is inclined with respect to the predetermined rotation axis and disposed between the first projection and the second projection.

The input device according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Underlying Knowledge Forming Basis of Present Disclosure

The inventors have found that the input device described in the "Background" section causes the following issue.

In the conventional input device described above, the projection of the rotating member is subjected to an alternating load from the groove even when the rotating member is rotated in either the first direction or the second direction.

In order to solve such an issue, an input device according to the present disclosure includes: a rotating member that rotates about a predetermined rotation axis; and a mover that includes a protrusion and moves in a direction different from a rotation direction of the rotating member along with rotation of the rotating member, the protrusion protruding toward an inner peripheral surface of the rotating member. The rotating member includes a first projection and a second projection that project from the inner peripheral surface toward the mover, and the protrusion of the mover is inclined with respect to the predetermined rotation axis and disposed between the first projection and the second projection.

With this aspect, the protrusion of the mover is formed to be inclined with respect to the predetermined rotation axis and disposed between the first projection and the second projection of the rotating member. With this, when the rotating member is rotated in the first direction, the first projection presses the protrusion to move the mover in a third direction. At this time, the first projection is subjected to a load from the protrusion, but the second projection is not subjected to a load from the protrusion. In contrast, when the rotating member is rotated in the second direction (direction opposite to the first direction), the second projection presses the protrusion to move the mover in a fourth direction (direction opposite to the third direction). At this time, the second projection is subjected to a load from the protrusion, but the first projection is not subjected to a load from the protrusion. Accordingly, only one of the first projection or the second projection is subjected to a load from the protrusion according to the rotation direction of the rotating member. Therefore, durability of the rotating member can be improved.

For example, the mover may move in a direction substantially parallel to the predetermined rotation axis, along with the rotation of the rotating member.

With this aspect, rotating the rotating member makes it possible to move the mover in a direction parallel to the predetermined rotation axis.

For example, a straight line that connects the first projection and the second projection may be inclined with respect to the predetermined rotation axis.

With this aspect, for example, when the rotating member is molded with a resin, an undercut can be avoided. Moreover, the distance between the first projection and the second projection can be reduced and the rotating member can be downsized.

For example, the first projection and the second projection may each include a spherical portion that contacts the protrusion.

This aspect enables the first projection and the second projection to point-contact the protrusion. Consequently, this reduces frictional resistance to be produced when each of the first projection and the second projection slides on the protrusion, and improves the feeling of operating the rotating member.

For example, the first projection may include: a first column member that projects from the inner peripheral surface of the rotating member toward the mover; and a first sphere member at a distal end of the first column member, the first sphere member having a diameter longer than a diameter of the first column member. The second projection may include: a second column member that projects from the inner peripheral surface of the rotating member toward the mover; and a second sphere member at a distal end of the second column member, the second sphere member having a diameter longer than a diameter of the second column member.

With this aspect, for example, when the rotating member is molded with a resin, a mold can be easily operated.

For example, the protrusion may taper toward both ends of the protrusion in a direction inclined with respect to the predetermined rotation axis, as viewed from a protruding direction of the protrusion.

With this aspect, when viewed from the protruding direction of the protrusion, the distance between the first projection and the second projection changes according to rotation of the rotating member. Therefore, forming both ends of the protrusion to taper makes it possible to cause the first projection and the second projection to slide stably on the protruding portion from one end to another end of the protrusion. As a result, the movable range of the rotating member can be increased.

For example, a protruding length of the protrusion from a center portion toward both ends of the protrusion may gradually decrease in a direction inclined with respect to the predetermined rotation axis, as viewed from a direction perpendicular to a protruding direction of the protrusion.

With this aspect, the first projection and the second projection each move in an arc-shaped trajectory, along with the rotation of the rotating member. Therefore, gradually decreasing the protruding length of the protrusion from a center portion to both ends of the protrusion makes it possible to cause the first projection and the second projection to slide stably on the protrusion from one end to another end of the protrusion. As a result, the movable range of the rotating member can be increased.

Hereinafter, an exemplary embodiment will be specifically described with reference to the drawings.

Note that the exemplary embodiment described below shows a general or specific example. The numerical values, shapes, materials, structural elements, the arrangement and connection of the structural elements, steps, the order of the steps, etc. mentioned in the following embodiment are mere examples and not intended to limit the present disclosure. Therefore, among the structural elements in the following embodiment, structural elements not recited in any one of the independent claims representing broadest concepts are described as optional structural components.

Embodiment

[1. Overview of Input Device]

Figure 1:
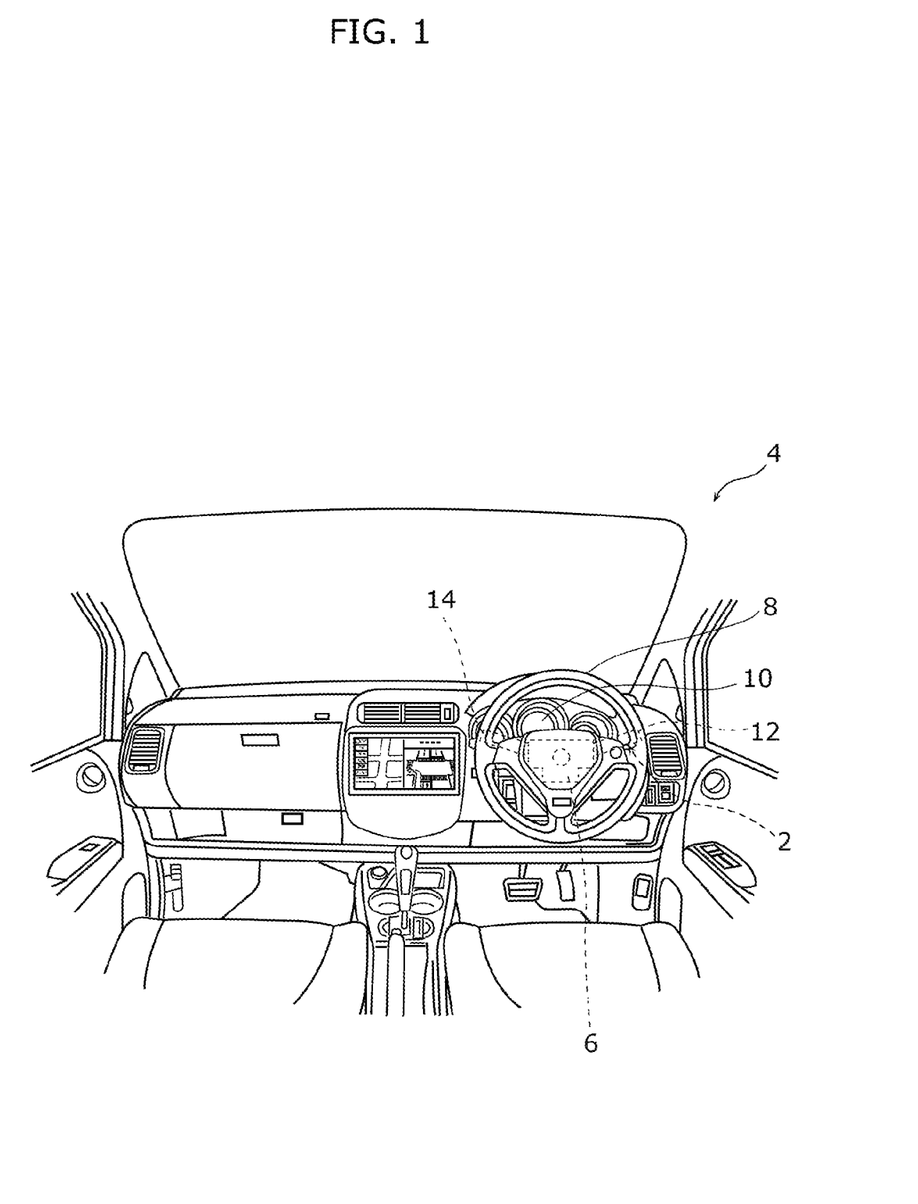
FIG. 1 is a diagram illustrating an example of a vehicle including an input device according to an embodiment.
Figure 2:
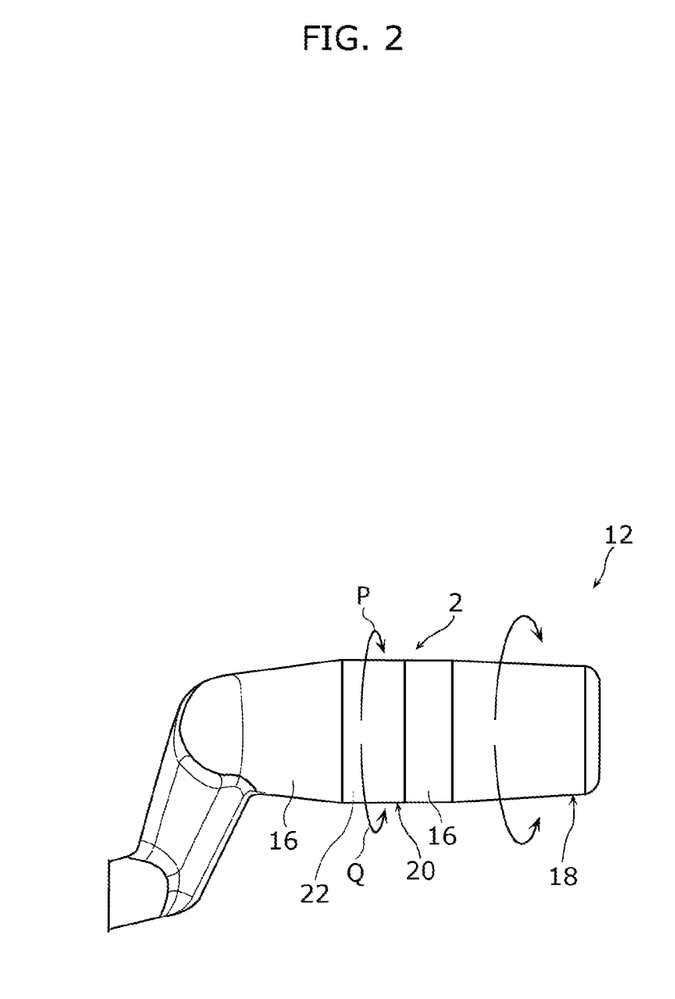
FIG. 2 is a diagram illustrating an external view of the input device according to the embodiment.

First, an overview of input device 2 according to an embodiment will be described with reference to FIG. 1 and FIG. 2. FIG. 1 is a diagram illustrating an example of vehicle 4 including input device 2 according to the embodiment. FIG. 2 is a diagram illustrating an external view of input device 2 according to the embodiment.

As illustrated in FIG. 1, the driver's sheet of vehicle 4 includes steering column 6. Steering column 6 is disposed between steering wheel 8 and dashboard 10. Vehicle 4 is, for example, an automobile, such as a passenger car, a bus, or a truck. Note that vehicle 4 is not limited to such an automobile, and may be a construction machine or a farm machine, for example.

Turn lever 12 and wiper lever 14 are slidably supported by steering column 6. As illustrated in FIG. 1, for example, when vehicle 4 has a right-hand drive, turn lever 12 is disposed on the right side as viewed from a driver, and wiper lever 14 is disposed on the left side as viewed from a driver.

Turn lever 12 is, for example, a combination switch lever including (a) a turn signal switch for flashing a turn signal lamp, (b) a lighting switch for switching between on and off of headlamps, parking lamps (width indicator), fog lamps, and tail lamps, (c) a headlight flashing switch for flashing the headlamps, and (d) a dimmer switch for switching between a high beam and a low beam of the headlamps.

As illustrated in FIG. 2, turn lever 12 includes lever body 16 and input device 2. Lever body 16 is formed in a cylindrical shape. Input device 2 includes a pair of rotary switches 18 and 20. A pair of rotary switches 18 and 20 are disposed spaced apart from each other in a longitudinal direction of lever body 16. Rotary switch 18 is, for example, a lighting switch for switching between on and off of the headlamps, the parking lamps, and the tail lamps. Moreover, rotary switch 20 is a lighting switch for switching between on and off of the fog lamps, for example.

Wiper lever 14 is, for example, a combination switch lever including (a) a windshield wiper switch for operating one or more windshield wipers, (b) a windshield washer switch for injecting a washer fluid onto a windshield, (c) a rear wiper switch for operating a rear wiper, and (d) a rear washer switch for injecting a washer fluid onto a rear window. Although not illustrated, wiper lever 14 includes an input device as with turn lever 12.

[2. Configuration of Input Device]

Figure 3:
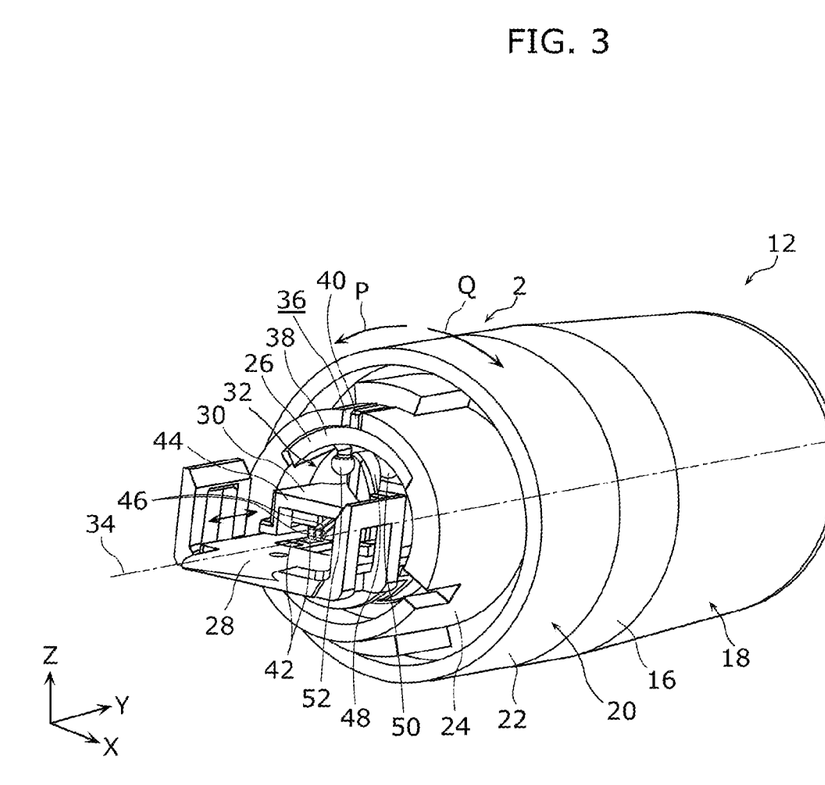
FIG. 3 is a perspective view illustrating the input device according to the embodiment.
Figure 4:
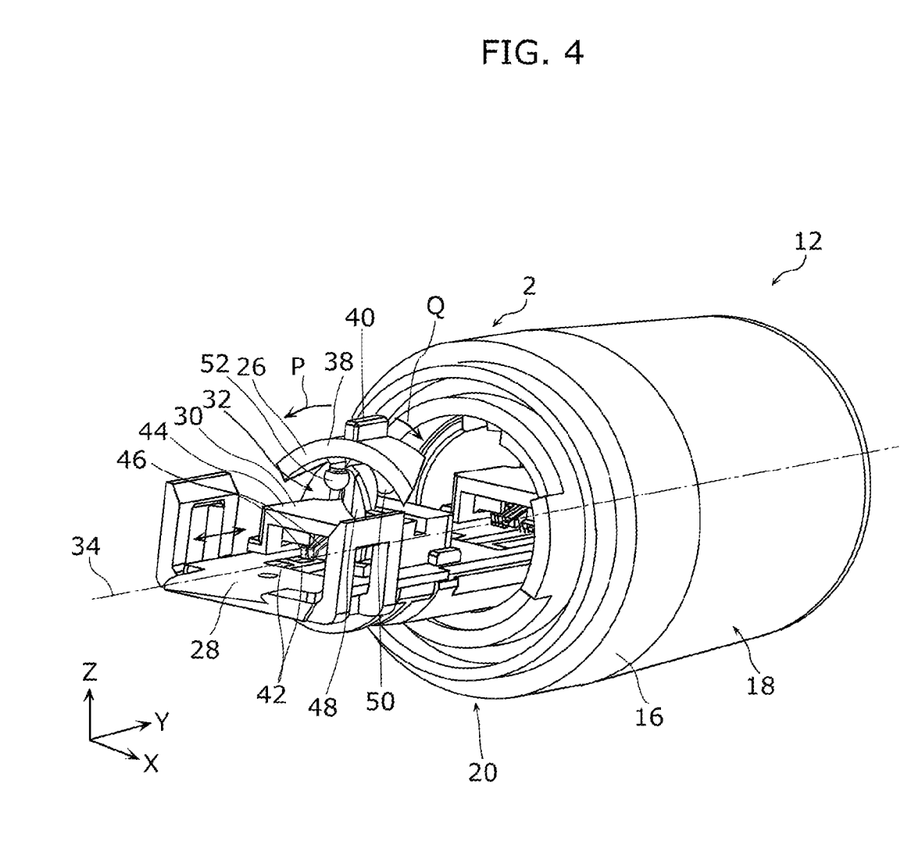
FIG. 4 is a perspective view illustrating the input device according to the embodiment, in which an external knob and a rotor member are omitted.
Figure 5:
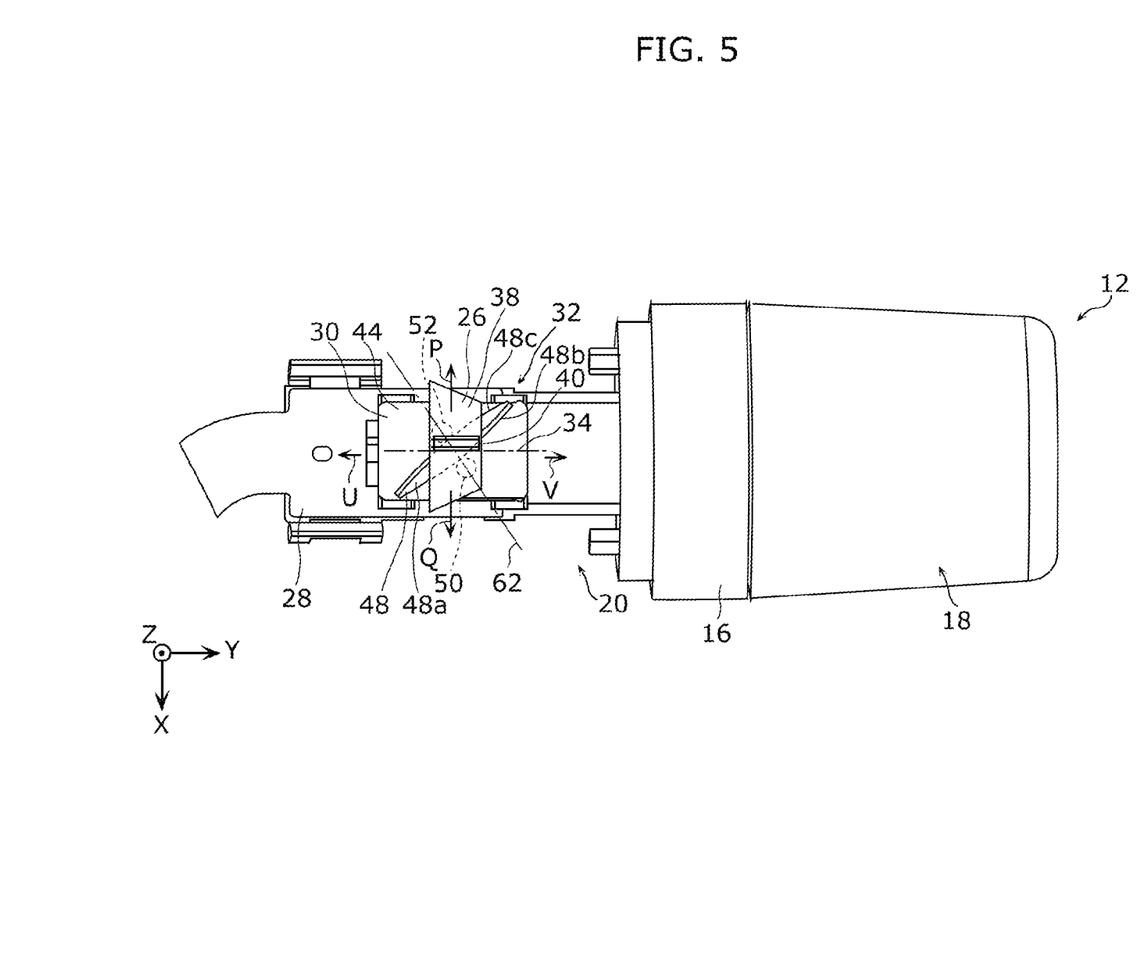
FIG. 5 is a plan view illustrating the input device according to the embodiment, in which the external knob and the rotor member are omitted.
Figure 6:
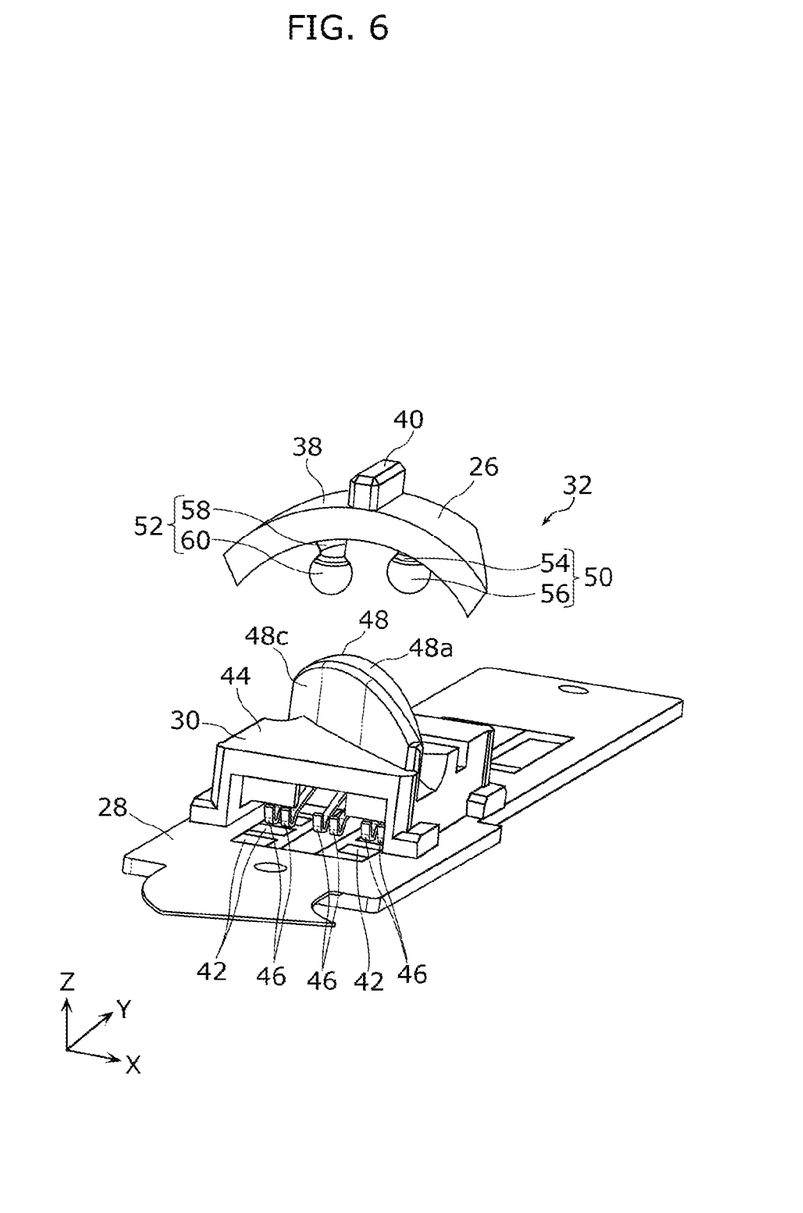
FIG. 6 is an exploded perspective view illustrating a motion converting mechanism according to the embodiment.
Figure 7:
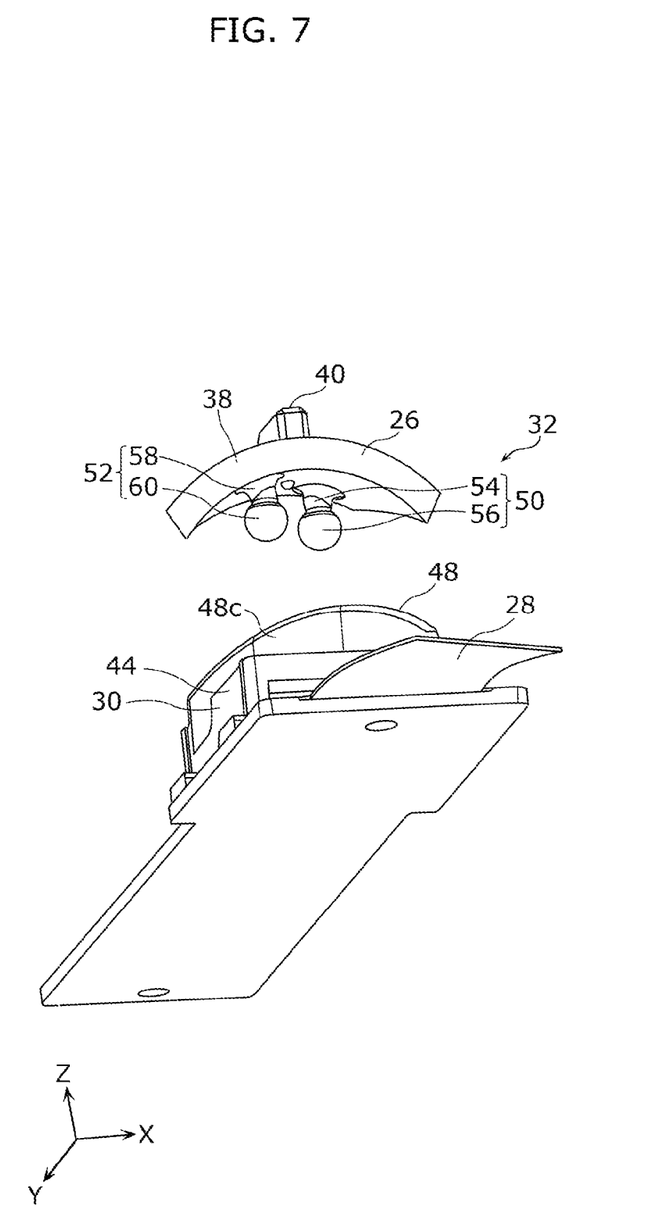
FIG. 7 is an exploded perspective view illustrating the motion converting mechanism according to the embodiment, as viewed from an angle different from FIG. 6.
Figure 8:
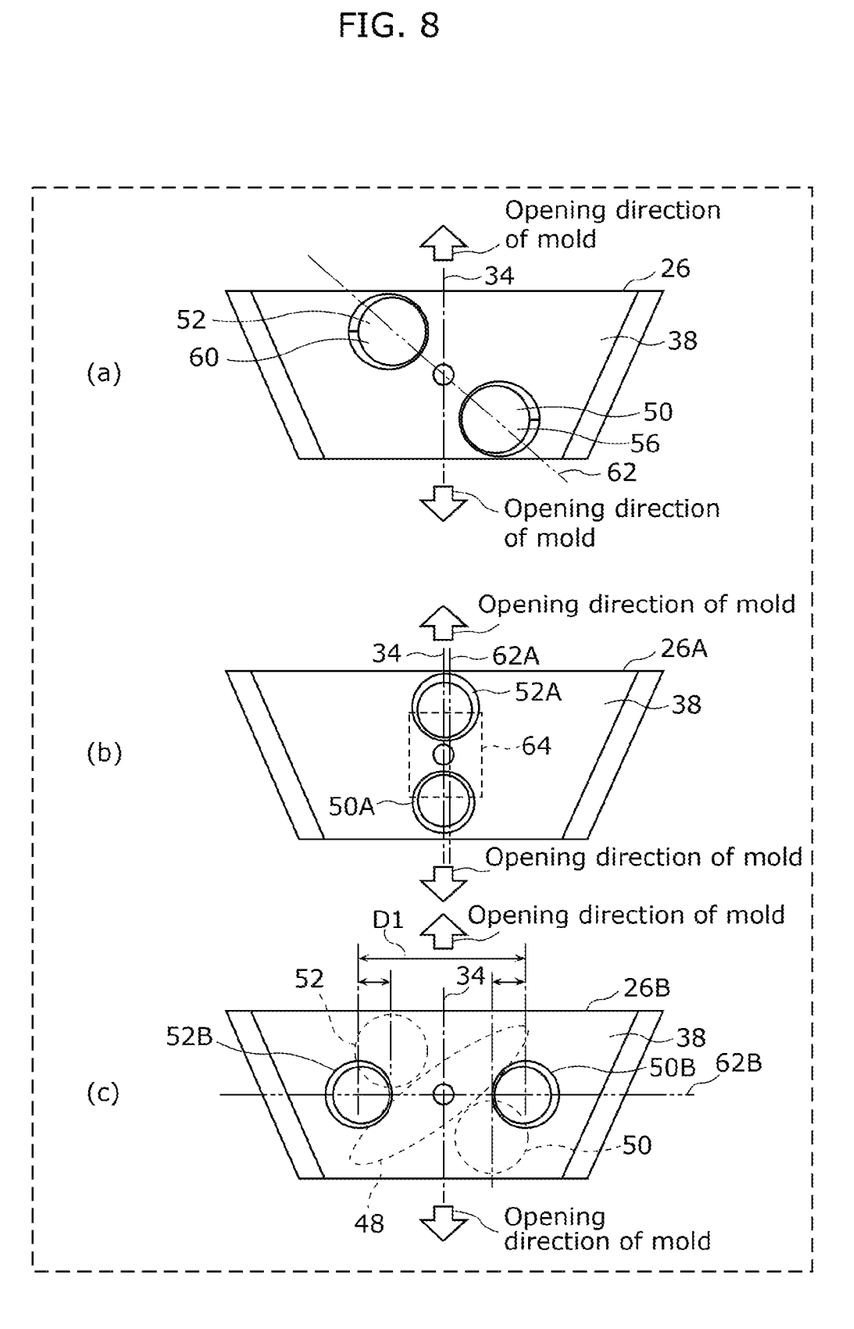
FIG. 8 is a diagram for describing relationships between (i) opening directions of a mold and (ii) positions of a first projection and a second projection, when the rotating member according to the embodiment is molded with a resin.

A configuration of input device 2 according to an embodiment will be described with reference to FIG. 2 through FIG. 8. FIG. 3 is a perspective view illustrating input device 2 according to the embodiment. FIG. 4 is a perspective view illustrating input device 2 according to the embodiment, in which external knob 22 and rotor member 24 are omitted. FIG. 5 is a plan view illustrating input device 2 according to the embodiment, in which external knob 22 and rotor member 24 are omitted. FIG. 6 is an exploded perspective view illustrating motion converting mechanism 32 according to the embodiment. FIG. 7 is an exploded perspective view illustrating motion converting mechanism 32 according to the embodiment, as viewed from an angle different from FIG. 6. FIG. 8 is a diagram for describing relationships between (i) opening directions of a mold and (ii) positions of first projection 50 (50A, 50B) and second projection 52 (52A, 52B), when the rotating member 26 (26A, 26B) according to the embodiment is molded with a resin.

Note that in each of FIG. 3 and subsequent figures, the width direction of input device 2 is referred to as the X axis direction, the depth direction of input device 2 is referred to as the Y axis direction, the height direction of input device 2 is referred to as the Z axis direction.

A pair of rotary switches 18 and 20 of input device 2 have the same configuration. Accordingly, the following describes the configuration of only rotary switch 20 of input device 2.

As illustrated in FIG. 2 through FIG. 4, rotary switch 20 of input device 2 includes external knob 22, rotor member 24, rotating member 26, substrate 28, mover 30, and motion converting mechanism 32.

As illustrated in FIG. 2 and FIG. 3, external knob 22 is formed in a cylindrical shape, and disposed at an outermost position in a radial direction of turn lever 12. External knob 22 is rotatably supported by lever body 16. More specifically, external knob 22 can rotate about predetermined rotation axis 34 with respect to lever body 16 in a first direction (direction indicated by arrow P in FIG. 2 and FIG. 3) and a second direction (direction indicated by arrow Q in FIG. 2 and FIG. 3) opposite to the first direction. Note that as illustrated in FIG. 3 and FIG. 4, predetermined rotation axis 34 is a virtual straight line passing through the diameter center of lever body 16 and extending in the longitudinal direction (Y axis direction) of lever body 16.

For example, when a driver rotates external knob 22 in the first direction, fog lamps of vehicle 4 are turned on. In contrast, when the driver rotates external knob 22 in the second direction, the fog lamps of vehicle 4 are turned off.

As illustrated in FIG. 3, rotor member 24 is a member for supporting rotating member 26. Rotor member 24 is formed in a cylindrical shape and attached to the inner peripheral surface of external knob 22. Slit 36 for positioning is formed in rotor member 24. Rotor member 24 rotates with external knob 22 about predetermined rotation axis 34.

As illustrated in FIG. 3, rotating member 26 is formed with, for example, a resin and supported by the inner peripheral surface of rotor member 24. As illustrated in FIG. 4 through FIG. 7, rotating member 26 includes body 38 and engagement section 40.

Body 38 is formed in a shape having an arc-shaped section. Engagement section 40 protrudes toward rotor member 24 from the outer peripheral surface of body 38 and engages with slit 36 of rotor member 24. With this, body 38 is positioned with respect to rotor member 24 and rotates with rotor member 24 and external knob 22. More specifically, body 38 (rotating member 26) rotates about predetermined rotation axis 34 with respect to mover 30 in the first direction (direction indicated by arrow P in FIG. 3 through FIG. 5) and the second direction (direction indicated by arrow Q in FIG. 3 through FIG. 5).

Substrate 28 is disposed inside lever body 16. On substrate 28, a plurality of electrode pads 42 are formed. Electrode pads 42 are electrically connected to a variety of electrical components (not illustrated) via electrical wires (not illustrated), such as turn signal lamps, headlamps, parking lamps, fog lamps, and tail lamps provided to vehicle 4.

Mover 30 is disposed between rotating member 26 and substrate 28. Mover 30 includes mover body 44 and a plurality of contact members 46. Mover body 44 is supported by a guide member (not illustrated) disposed inside lever body 16. Mover body 44 linearly moves, along the guide member, substantially parallel to predetermined rotation axis 34 (i.e., in a direction different from the rotation direction of rotating member 26). More specifically, as illustrated in FIG. 5, mover body 44 (mover 30) linearly moves along predetermined rotation axis 34 with respect to rotating member 26, in a third direction (direction indicated by arrow U in FIG. 5) and a fourth direction (direction indicated by arrow V in FIG. 5) opposite to the third direction. Note that in the present specification, "substantially parallel" is a concept that includes not only perfectly parallel, but also includes a range of, for example, ±10 from the direction that is perfectly parallel.

Contact members 46 are attached on a surface that opposes substrate 28 of mover body 44. Each of contact members 46 is electrically in contact with a corresponding one of electrode pads 42 formed on substrate 28. According to the moving direction of mover 30, the relationships of electrical connections between contact members 46 and electrode pads 42 change. With this, for example, when mover 30 linearly moves in the third direction, the fog lamps of vehicle 4 are turned on. When mover 30 linearly moves in the fourth direction, the fog lamps of vehicle 4 are turned off.

Motion converting mechanism 32 is a mechanism for converting rotation of rotating member 26 into a linear movement of mover 30. As illustrated in FIG. 6 and FIG. 7, motion converting mechanism 32 includes protrusion 48 formed on mover 30; and first projection 50 and second projection 52 formed on rotating member 26.

Protrusion 48 is formed to protrude toward the inner peripheral surface of body 38 of rotating member 26 from a surface of mover body 44 that opposes rotating member 26. As illustrated in FIG. 5, protrusion 48 is formed to be inclined with respect to predetermined rotation axis 34 and disposed between first projection 50 and second projection 52 of rotating member 26. Protrusion 48 is formed in a shape having a substantially semi-cylindrical section, and includes top surface 48a, first side surface 48b, and second side surface 48c opposite to first side surface 48b.

As illustrated in FIG. 6, top surface 48a of protrusion 48 curves in an arc shape in a direction inclined with respect to predetermined rotation axis 34. In other words, protrusion 48 is formed such that the protruding length of protrusion 48 from a center portion toward both ends of protrusion 48 gradually decreases in a direction inclined with respect to predetermined rotation axis 34, as viewed from a direction perpendicular to the protruding direction of protrusion 48 (direction perpendicular to first side surface 48b and second side surface 48c).

Moreover, as illustrated in FIG. 5, protrusion 48 is formed to taper toward both ends of protrusion 48 in a direction inclined with respect to predetermined rotation axis 34, as viewed from the protruding direction of protrusion 48 (Z axis direction).

As illustrated in FIG. 6 and FIG. 7, first projection 50 protrudes toward mover 30 from the inner peripheral surface of body 38. First projection 50 includes first column member 54 and first sphere member 56. First column member 54 is formed in a substantially cylindrical shape, and protrudes toward mover 30 from the inner peripheral surface of body 38. First sphere member 56 is formed in a spherical shape and disposed at the distal end of first column member 54. The diameter of first sphere member 56 is longer than the diameter of first column member 54. First sphere member 56 is disposed to oppose first side surface 48b of protrusion 48 of mover 30. When rotating member 26 rotates in the first direction, first sphere member 56 contacts (point contacts) first side surface 48b of protrusion 48 of mover 30. In other words, first projection 50 includes a spherical portion (first sphere member 56) that contacts protrusion 48.

As illustrated in FIG. 6 and FIG. 7, second projection 52 protrudes toward mover 30 from the inner peripheral surface of body 38. Second projection 52 includes second column member 58 and second sphere member 60. Second column member 58 is formed in a substantially cylindrical shape, and protrudes toward mover 30 from the inner peripheral surface of body 38. Second sphere member 60 is formed in a spherical shape and disposed at the distal end of second column member 58. The diameter of second sphere member 60 is longer than the diameter of second column member 58. Second sphere member 60 is disposed to oppose second side surface 48c of protrusion 48 of mover 30. When rotating member 26 rotates in the second direction, second sphere member 60 contacts (point contacts) second side surface 48c of protrusion 48 of mover 30. In other words, second projection 52 includes a spherical portion (second sphere member 60) that contacts protrusion 48.

Moreover, as illustrated in FIG. 5, straight line 62 that connects first projection 50 and second projection 52 is inclined with respect to predetermined rotation axis 34.

Here, with reference to FIG. 8, relationships between (i) opening directions of a mold when rotating member 26 (26A, 26B) is molded with a resin and (ii) positions of first projection 50 (50A, 50B) and second projection 52 (52A, 52B) will be described. Hereinafter, a case where the opening directions of the mold are substantially parallel to predetermined rotation axis 34 will be described.

As illustrated in (a) in FIG. 8, in rotating member 26 according to the embodiment, straight line 62 that connects first projection 50 and second projection 52 is inclined with respect to predetermined rotation axis 34. In this case, there is no undercut that cannot be removed from the mold when the mold is opened.

As illustrated in (b) in FIG. 8, in rotating member 26A according to Comparative Example 1, straight line 62A that connects first projection 50A and second projection 52A is parallel to predetermined rotation axis 34. In this case, there is undercut 64 that cannot be removed from the mold when the mold is opened.

As illustrated in (c) in FIG. 8, in rotating member 26B according to Comparative Example 2, straight line 62B that connects first projection 50B and second projection 52B is perpendicular to predetermined rotation axis 34. In this case, there is no undercut that cannot be removed from the mold when the mold is opened. However, in such a case, distance D1 between first projection 50B and second projection 52B in the direction perpendicular to predetermined rotation axis 34 becomes longer than in the configuration in (a) in FIG. 8 (longer than the distance between first projection 50 and second projection 52 in the direction perpendicular to predetermined rotation axis 34). Therefore, rotating member 26B becomes larger by the distance.

Accordingly, as illustrated in (a) in FIG. 8, straight line 62 that connects first projection 50 and second projection 52 may be inclined with respect to predetermined rotation axis 34. With this, when rotating member 26 is molded with a resin, an undercut can be avoided. Moreover, the distance between first projection 50 and second projection 52 can be reduced and rotating member 26 can be downsized.

[3. Operation of Motion Converting Mechanism]

Figure 9:
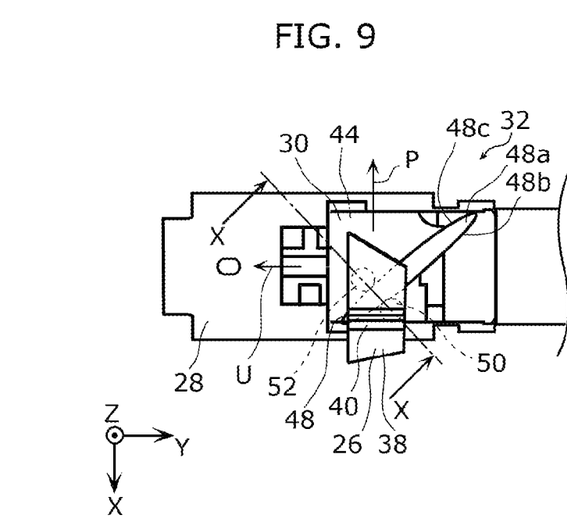
FIG. 9 is a plan view illustrating the motion converting mechanism according to the embodiment when the rotating member is rotated in a first direction.
Figure 10:
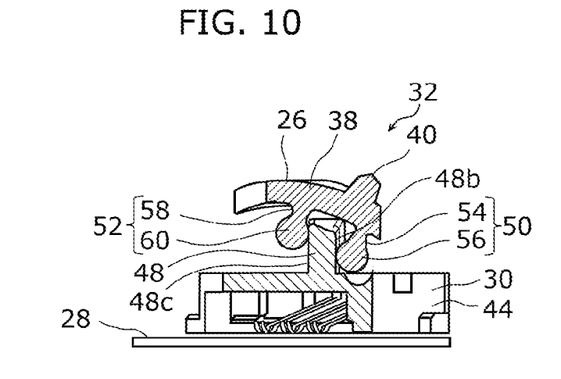
FIG. 10 is a sectional view of the motion converting mechanism according to the embodiment, taken along line X-X in FIG. 9.
Figure 11:
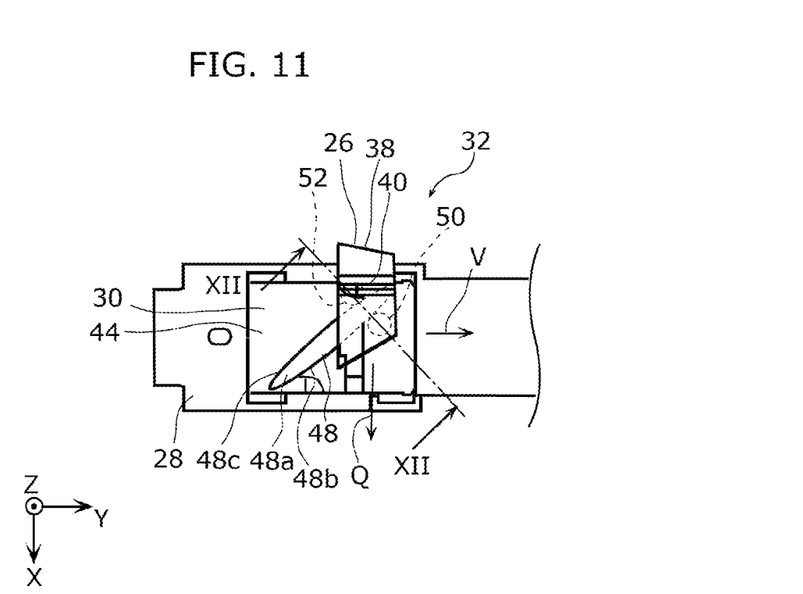
FIG. 11 is a plan view illustrating the motion converting mechanism according to the embodiment when the rotating member is rotated in a second direction.
Figure 12:
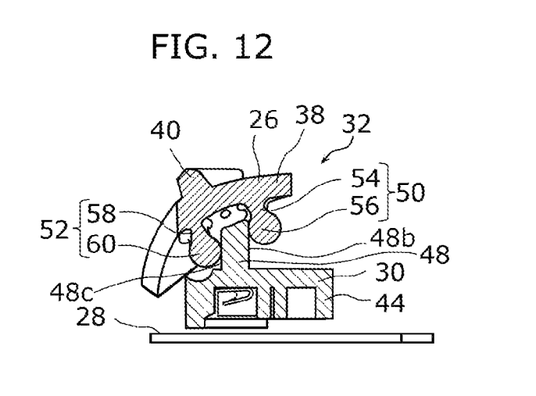
FIG. 12 is a sectional view of the motion converting mechanism according to the embodiment, taken along line XII-XII in FIG. 11.

An operation of motion converting mechanism 32 will be described with reference to FIG. 9 through FIG. 12. FIG. 9 is a plan view illustrating motion converting mechanism 32 according to the embodiment when rotating member 26 is rotated in the first direction. FIG. 10 is a sectional view of motion converting mechanism 32 according to the embodiment, taken along line X-X in FIG. 9. FIG. 11 is a plan view illustrating motion converting mechanism 32 according to the embodiment when rotating member 26 is rotated in the second direction. FIG. 12 is a sectional view of motion converting mechanism 32 according to the embodiment, taken along line XII-XII in FIG. 11.

First, as illustrated in FIG. 9, a case where rotating member 26 is rotated in the first direction (direction indicated by arrow P in FIG. 9) will be described. In this case, as illustrated in FIG. 10, first sphere member 56 of first projection 50 of rotating member 26 slides on first side surface 48b of protrusion 48 from one end (a first end) to another end (a second end) of protrusion 48 in a direction inclined with respect to predetermined rotation axis 34 (direction perpendicular to the plane of FIG. 10), while first sphere member 56 is pressing first side surface 48b of protrusion 48 of mover 30. Mover 30 linearly moves in the third direction (direction indicated by arrow U in FIG. 9) by being subject to pressing force from first sphere member 56 of first projection 50. Note that, since first sphere member 56 point-contacts first side surface 48b of protrusion 48, frictional resistance when first sphere member 56 slides on first side surface 48b of protrusion 48 can be reduced, and the feeling of operating rotating member 26 can be improved.

At this time, a gap (not illustrated) is formed between second sphere member 60 of second protrusion 52 and second side surface 48c of protrusion 48. Therefore, when rotating member 26 is rotated in the first direction, first sphere member 56 of first projection 50 is subjected to a load from protrusion 48, but second sphere member 60 of second projection 52 is not subjected to a load from protrusion 48.

Next, as illustrated in FIG. 11, a case where rotating member 26 is rotated in the second direction (direction indicated by arrow Q in FIG. 11) will be described. In this case, as illustrated in FIG. 12, second sphere member 60 of second projection 52 of rotating member 26 slides on second side surface 48c of protrusion 48 from the second end to the first end of protrusion 48 in a direction inclined with respect to predetermined rotation axis 34 (direction perpendicular to the plane of FIG. 12), while second sphere member 60 is pressing second side surface 48c of protrusion 48 of mover 30. Mover 30 linearly moves in the fourth direction (direction indicated by arrow V in FIG. 11) by being subjected to pressing force from second sphere member 60 of second projection 52. Note that, since second sphere member 60 point-contacts second side surface 48c of protrusion 48, frictional resistance when second sphere member 60 slides on second side surface 48c of protrusion 48 can be reduced, and the feeling of operating rotating member 26 can be improved.

At this time, a gap (not illustrated) is formed between first sphere member 56 of first protrusion 50 and first side surface 48b of protrusion 48. Therefore, when rotating member 26 is rotated in the second direction, second sphere member 60 of second projection 52 is subjected to a load from protrusion 48, but first sphere member 56 of first projection 50 is not subjected to a load from protrusion 48.

As described above, mover 30 linearly moves in a direction substantially parallel to predetermined rotation axis 34, along with the rotation of rotating member 26.

[4. Effects]

Figure 13:
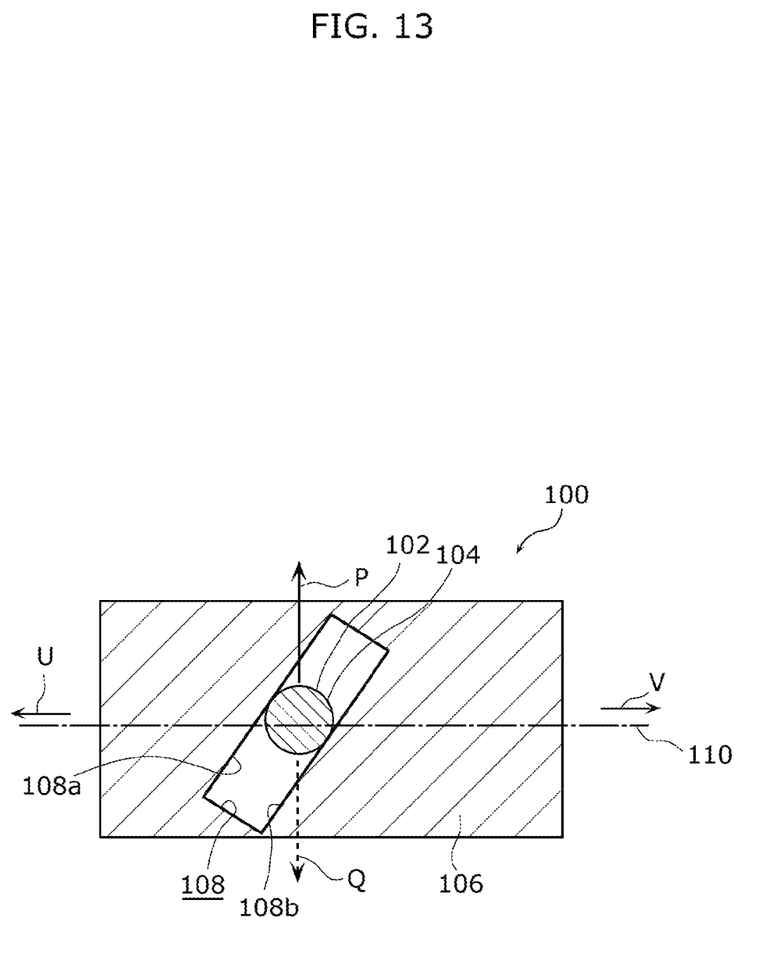
FIG. 13 is a schematic sectional view of a motion converting mechanism according to a comparative example.

Effects that can be obtained with input device 2 according to the embodiment will be described along with description of a configuration of motion converting mechanism 100 according to a comparative example. FIG. 13 is a schematic sectional view of motion converting mechanism 100 according to a comparative example.

As illustrated in FIG. 13, motion converting mechanism 100 according to the comparative example includes projection 104 that has a cylindrical shape and projects from the inner peripheral surface of rotating member 102 and groove 108 formed in mover 106. Groove 108 is formed to be inclined with respect to predetermined rotation axis 110 of rotating member 102. Projection 104 is slidably engaged with groove 108, and contacts (point-contacts) each of first inner surface 108a and second inner surface 108b (surface that opposes first inner side surface 108a) of groove 108.

When rotating member 102 is rotated in the first direction (direction indicated by arrow P in FIG. 13), projection 104 slides on first inner surface 108a of groove 108 from one end (a first end) to another end (a second end) of groove 108 while projection 104 is pressing first inner surface 108a of groove 108. Mover 106 linearly moves in a third direction (direction indicated by arrow U in FIG. 13) by being subjected to pressing force from projection 104.

Moreover, when rotating member 102 is rotated in the second direction (direction indicated by arrow Q in FIG. 13) opposite to the first direction, projection 104 slides on second inner surface 108b of groove 108 from the second end to the first end of groove 108 while projection 104 is pressing second inner surface 108b of groove 108. Mover 106 linearly moves in a fourth direction (direction indicated by arrow V in FIG. 13) opposite to the third direction by being subjected to pressing force from projection 104.

However, with such a configuration, projection 104 of rotating member 102 is subjected to an alternating load from groove 108, even when rotating member 102 rotates in either the first direction or the second direction. Therefore, an issue occurs that durability (for example, durability in terms of failure life) of projection 104 of rotating member 102 decreases.

In contrast, in motion converting mechanism 32 of input device 2 according to the embodiment, protrusion 48 of mover 30 is formed to be inclined with respect to predetermined rotation axis 34 and disposed between first projection 50 and second projection 52 of rotating member 26. With this, when rotating member 26 is rotated in the first direction, first projection 50 presses protrusion 48 to move mover 30 in the third direction. At this time, first projection 50 is subjected to a load from protrusion 48, but second projection 52 is not subjected to a load from protrusion 48.

In contrast, when rotating member 26 is rotated in the second direction, second projection 52 presses protrusion 48 to move mover 30 in the fourth direction. At this time, second projection 52 is subjected to a load from protrusion 48, but first projection 50 is not subjected to a load from protrusion 48.

Accordingly, only one of first projection 50 or second projection 52 is subjected to a load from protrusion 48 according to the rotation direction of rotating member 26. Therefore, durability (for example, durability in terms of failure life) of rotating member 26 can be improved.

Moreover, when viewed from the protruding direction (Z axis direction) of protrusion 48, the distance between first projection 50 and second projection 52 changes according to rotation of rotating member 26. More specifically, when viewed from the protruding direction of protrusion 48, the distance between first projection 50 and second projection 52 is greatest when the rotating position of rotating member 26 is a center of the rotation range, and gradually decreases as the rotating position of rotating member 26 moves toward each of the ends of the rotation range. Therefore, as described above, forming both ends of protrusion 48 to taper makes it possible to cause first projection 50 and second projection 52 to slide stably on protrusion 48 from the first end to the second end of protrusion 48. As a result, the movable range of rotating member 26 can be increased.

Moreover, first projection 50 and second projection 52 moves in an arc-shaped trajectory, along with the rotation of rotating member 26. Therefore, as described above, gradually decreasing the protruding length of protrusion 48 from a center portion toward both ends of protrusion 48 makes it possible to cause first projection 50 and second projection 52 to slide stably on protrusion 48 from the first end to the second end of protrusion 48. As a result, the movable range of rotating member 26 can be increased.

Other Variations

One or more input devices according to one or more aspects have been described above, but the present disclosure is not limited to the embodiment described above. Such one or more aspects of the present disclosure may include variations achieved by making various modifications to the present disclosure that can be conceived by those skilled in the art or forms achieved by combining structural elements in different embodiments, without departing from the essence of the present disclosure.

In the above embodiment, input device 2 is applied to the combination switch lever of vehicle 4, but this is not limiting. For example, input device 2 may be applied to an operational lever or the like of consumer-use equipment or industrial equipment.

While exemplary embodiments have been described herein above, it is to be appreciated that various changes in form and detail may be made without departing from the spirit and scope of the present disclosure as presently or hereafter claimed.

Further Information about Technical Background to this Application

The disclosures of the following patent application including specification, drawings, and claims are incorporated herein by reference in their entirety: Japanese Patent Application No. 2021-147853 filed on Sep. 10, 2021.

INDUSTRIAL APPLICABILITY

An input device according to the present disclosure is applicable to a combination switch lever or the like included in a vehicle, such as an automobile.

The invention claimed is:

1. An input device comprising:
    a rotating member that rotates about a predetermined rotation axis; and
    a mover that includes a protrusion and moves in a direction different from a rotation direction of the rotating member along with rotation of the rotating member, the protrusion protruding toward an inner peripheral surface of the rotating member, wherein
    the rotating member includes a first projection and a second projection that project from the inner peripheral surface toward the mover,
    the protrusion of the mover is inclined with respect to the predetermined rotation axis and disposed between the first projection and the second projection, and
    a straight line that connects the first projection and the second projection is inclined with respect to the predetermined axis.

2. The input device according to claim 1, wherein the mover moves in a direction substantially parallel to the predetermined rotation axis, along with the rotation of the rotating member.

3. The input device according to claim 1, wherein the first projection and the second projection each include a spherical portion that contacts the protrusion.

4. The input device according to claim 3, wherein the first projection includes:
    a first column member that projects from the inner peripheral surface of the rotating member toward the mover; and
    a first sphere member at a distal end of the first column member, the first sphere member having a diameter longer than a diameter of the first column member, and
the second projection includes:
    a second column member that projects from the inner peripheral surface of the rotating member toward the mover; and
    a second sphere member at a distal end of the second column member, the second sphere member having a diameter longer than a diameter of the second column member.

5. The input device according to claim 1, wherein the protrusion tapers toward both ends of the protrusion in a direction inclined with respect to the predetermined rotation axis, as viewed from a protruding direction of the protrusion.

6. The input device according to claim 1, wherein a protruding length of the protrusion from a center portion toward both ends of the protrusion gradually decreases in a direction inclined with respect to the predetermined rotation axis, as viewed from a direction perpendicular to a protruding direction of the protrusion.

7. An input device comprising:
    a rotating member that rotates about a predetermined rotation axis; and
    a mover that includes a protrusion and moves in a direction different from a rotation direction of the rotating member along with rotation of the rotating member, the protrusion protruding toward an inner peripheral surface of the rotating member, wherein
    the rotating member includes a first projection and a second projection that project from the inner peripheral surface toward the mover,
    the protrusion of the mover is inclined with respect to the predetermined rotation axis and disposed between the first projection and the second projection,
    the first projection and the second projection each include a spherical portion that contacts the protrusion, and
    the first projection includes:
        a first column member that projects from the inner peripheral surface of the rotating member toward the mover; and
        a first sphere member at a distal end of the first column member, the first sphere member having a diameter longer than a diameter of the first column member, and
    the second projection includes:
        a second column member that projects from the inner peripheral surface of the rotating member toward the mover; and
        a second sphere member at a distal end of the second column member, the second sphere member having a diameter longer than a diameter of the second column member.

8. An input device comprising:
    a rotating member that rotates about a predetermined rotation axis; and
    a mover that includes a protrusion and moves in a direction different from a rotation direction of the rotating member along with rotation of the rotating member, the protrusion protruding toward an inner peripheral surface of the rotating member, wherein
    the rotating member includes a first projection and a second projection that project from the inner peripheral surface toward the mover,
    the protrusion of the mover is inclined with respect to the predetermined rotation axis and disposed between the first projection and the second projection, and
    the protrusion tapers toward both ends of the protrusion in a direction inclined with respect to the predetermined rotation axis, as viewed from a protruding direction of the protrusion.

* * * * *